United States Patent
Schall et al.

(10) Patent No.: US 6,459,205 B1
(45) Date of Patent: Oct. 1, 2002

(54) PROPULSION DEVICE AND METHOD OF GENERATING SHOCK WAVES

(75) Inventors: Wolfgang Schall, Waldenbuch; Eberhard Zeyfang, Reichenbach; Wolfgang Riede, Muehlacker; Wilhelm Mayerhofer, Gerlingen, all of (DE)

(73) Assignee: Deutsches Zentrum fuer Luft-und Raumfahrt e.V., Bonn (DE)

( * ) Notice: Subject to any disclaimer, the term of this patent is extended or adjusted under 35 U.S.C. 154(b) by 0 days.

(21) Appl. No.: 09/827,496

(22) Filed: Apr. 6, 2001

(30) Foreign Application Priority Data

Apr. 7, 2000 (DE) .......................................... 100 17 343

(51) Int. Cl.$^7$ .............................. H01J 7/24; B64G 1/00
(52) U.S. Cl. ................................ 315/111.21; 244/158 R
(58) Field of Search ................... 315/111.21, 111.71, 315/111.81; 60/203.1, 39.821; 244/158 R, 162, 169, 172

(56) References Cited

U.S. PATENT DOCUMENTS

| | | | | |
|---|---|---|---|---|
| 3,818,700 A | | 6/1974 | Kantrowitz et al. ........... 60/203 |
| 3,825,211 A | | 7/1974 | Minovitch ................. 244/15 B |
| 4,036,012 A | | 7/1977 | Monsler ....................... 60/203 |
| 4,426,843 A | | 1/1984 | Fowler et al. .............. 60/203.1 |
| 5,152,135 A | | 10/1992 | Kare .......................... 60/203.1 |
| 5,234,183 A | * | 8/1993 | Hammer ................. 244/158 R |
| 5,325,020 A | * | 6/1994 | Campbell et al. ........ 315/111.21 |
| 5,838,120 A | * | 11/1998 | Semenkin et al. ............ 315/505 |
| 6,153,976 A | * | 11/2000 | Spanjers ................. 315/111.21 |

FOREIGN PATENT DOCUMENTS

DE 295 22 050.3 11/1999

OTHER PUBLICATIONS

Pirri, A.N. et al., "Propulsion by Absorption of Laser Radiation," AIAA Journal, vol. 12, No. 9, Sep. 1974, pp. 1254–1261.
Patent Abstracts of Japan, Abstract of Japanese Patent No. 63-280 872, "Strong Laser Jet Injection Device and Method Thereof", M–802, vol. 13, No. 83, Feb. 27, 1989.
Patent Abstracts of Japan, Abstract of Japanese Patent No. 5-79451, "Plasma Propulsion Device", M–1454, vol. 17, No. 407, Jul. 29, 1993.
Myrabo, L.N. et al., "Ground and Flight Tests of a Laser Propelled Vehicle", AIAA (98–1001), 36$^{th}$ Aerospace Sciences Meeting & Exhibit on Jan. 12–15, 1998, Reno, NV.
Selph, C. et al., "Laser Propulsion", Proc. 27$^{th}$ International Astronautical Congress, ed. L.G. Napolitano, Pergamon Press, Oxford, 1977.
Musal, Jr., Henry M., "Pulsed Laser Initiation of Surface Plasma on Metal Mirrors", Bennet et al. Damage in Laser Materials: 1980, Nat. Bur. Stand. (U.S.) Spec. Publ. 620 (1981).
Abstract of DE 19526295, Jun. 13, 1996.

* cited by examiner

*Primary Examiner*—Don Wong
*Assistant Examiner*—D. A. Minh
(74) *Attorney, Agent, or Firm*—Barry R. Lipsitz; Douglas M. McAllister

(57) ABSTRACT

For providing a propulsion device particularly for a spacecraft, comprising a plasma chamber in which a plasma can be produced in a propellant, and a focussing arrangement for focussing an electromagnetic radiation field into a focussing region in the plasma chamber in order to produce the plasma, the propulsion device being highly efficient and controllable, it is proposed to arrange in the plasma chamber a plasma ignition arrangement whereby a material which lowers the plasma breakdown threshold in the propellant can be brought into the focussing region.

40 Claims, 5 Drawing Sheets

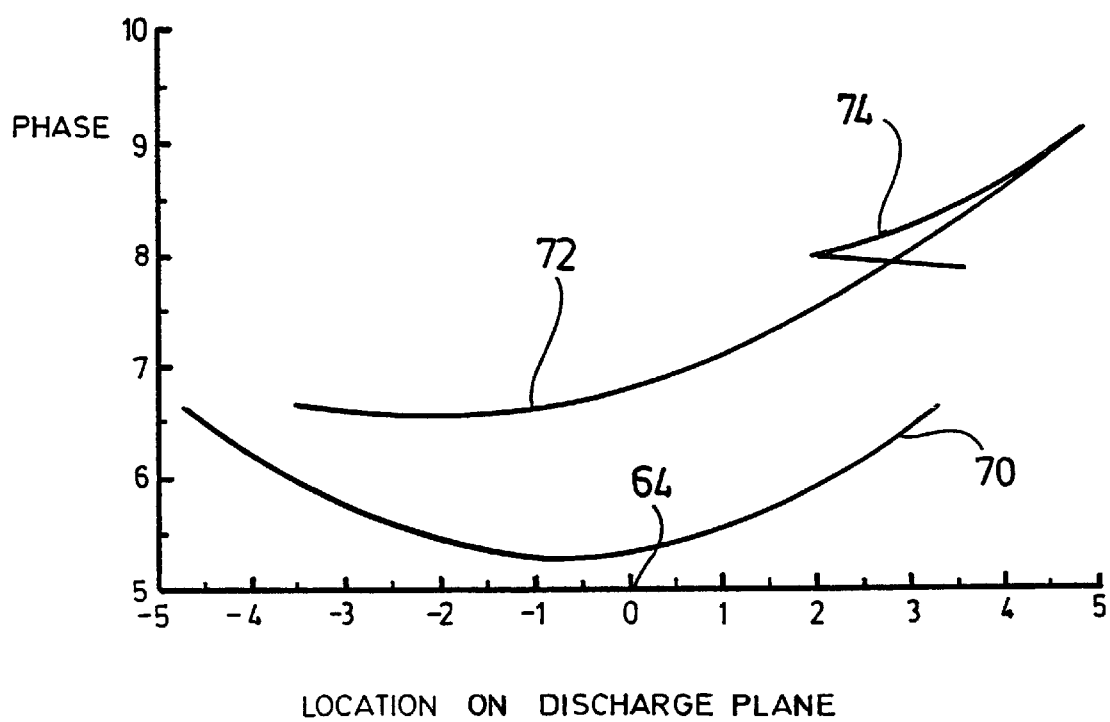

PROPULSION DEVICE AND METHOD OF GENERATING SHOCK WAVES

BACKGROUND OF THE INVENTION

The invention relates to a propulsion device particularly for a spacecraft, comprising a plasma chamber in which a plasma is producible in a propellant, and a focussing arrangement for focussing an electromagnetic radiation field into a focussing region in the plasma chamber in order to produce the plasma.

It also relates to a method of forming shock waves, particularly for propelling a spacecraft, by producing a plasma in a propellant, wherein an electromagnetic radiation field is focussed into a focussing region of a plasma chamber to produce plasma in the propellant.

It has been proposed for example in U.S. Pat. No. 3,825,211 to propel a spacecraft by means of a laser beam, the laser being installed on earth or in a satellite. For this purpose the spacecraft has a parabolic cylindrical reflector, and a propellant is fed to a focal axis of that reflector.

Similar arrangements are described in U.S. Pat. Nos. 3,818,700, 4,426,843 and 5,152,135.

The laser beam produces a plasma in the propellant, which expands and thus in turn accelerates the propellant. This is then converted into propelling energy to propel the spacecraft by a suitable device such as a nozzle arrangement.

With the development of pulsed high-powered lasers the high spatial coherence of laser radiation enables the radiation energy to be transmitted into the plasma chamber over distances of the order of magnitude of 100 to 1000 km.

As a laser-assisted propulsion system need not carry its energy generator with it and may even be installed quite far away from the propulsion system, the starting mass of a spacecraft provided with such a propulsion system can be kept low. In addition higher specific momentums can be produced with laser propulsion systems than with conventional propulsion systems based on chemical combustion.

It is the object of the invention to provide a propulsion device and a method of forming shock waves, which is highly efficient and controllable, respectively.

BRIEF SUMMARY OF THE INVENTION

This object is achieved in accordance with the invention, in that there is arranged in the plasma chamber a plasma ignition arrangement for bringing a material (the ignition medium) which lowers the plasma breakdown threshold in the propellant into the focussing region.

In accordance with the invention it is possible to produce a plasma at a pre-defined location in the focussing region, namely substantially where the material which lowers the plasma breakdown threshold is positioned or introduced, the plasma in turn leading to the formation of a pressure wave. Plasma ignition thereby takes place in a controlled manner and particularly at a point-like location, that is to say, the time and place of ignition are guaranteed to be highly reproducible.

As the electromagnetic radiation field and particularly laser radiation is absorbed better by a plasma than by a neutral propellant, the defined plasma production also increases propelling efficiency; the invention greatly improves the coupling in of the energy of the electromagnetic radiation field into the propulsion device. In particular the invention makes it unnecessary to feed an additional absorber medium to the plasma chamber as proposed e.g. in U.S. Pat. Nos. 3,818,700 or 4,036,012.

The fact that the plasma and consequently plasma pulses are produced at a pre-defined location in the plasma chamber, owing to the introduction of the material which lowers the plasma breakdown threshold in the propellant into the focussing region, makes it possible to control the thrust vector of the propulsion device, as the pre-defined location of plasma production in the focussing region is controllable. This can be achieved in a simple way by positioning the threshold-lowering material in the focussing region in a controlled manner. The position of a spacecraft provided with the propulsion device in accordance with the invention can thereby also be controlled.

With the location of plasma formation being controllable it is also possible to inject the electromagnetic radiation field at a transverse angle of incidence to the axis of the plasma chamber and thus to inject it transversely to the axis of a spacecraft, as the thrust vector of the propulsion device can accordingly be appropriately tilted by controlling the pre-defined location of plasma production. It is then unnecessary for the focussing arrangement to be aligned accurately with the incident electromagnetic radiation field. As a result the coupling of the energy of the electromagnetic radiation field into the plasma chamber can be improved, as the coupling field can be correspondingly guided; it may e.g. be advantageous for the radiation field not to be guided through a propellant discharge region of the drive device in order to avoid energy losses through absorption.

Misfiring is largely avoided by use of the material which lowers the plasma breakdown threshold in the propellant. Such misfiring starts in particular at a wall of the plasma chamber and leads to degradation and/or denudation of material in that structure. Moreover use of an ignition medium greatly reduces fluctuations in the magnitude and direction of the thrust vector of the propulsion device, which are observed without such a medium.

It is especially advantageous for the material which lowers the plasma breakdown threshold to be a metal. In particular the material which lowers the plasma breakdown threshold is copper. For example the breakdown threshold in air has been found to be about three orders of magnitude higher than the corresponding value for copper vapour over a copper surface in air. In the case of a $CO_2$ laser with a wavelength of 10.6 $\mu$m given a pulse duration of 10 $\mu$s the breakdown threshold in air is about 15 $kJ/cm^2$ and that in copper vapour about 10 $J/cm^2$. In this connection see also H M Musal, "Pulsed laser initiation of surface plasma on metal mirrors", Bennett, H E, Glass, A J, A H Guenther, eds, Damage in laser materials: 1980, Nat. Bur. Stand. (U S) Spec. Publ. 620 (1981), page 227.

It is particularly advantageous for the plasma ignition arrangement to be arranged in the plasma chamber so displaceably that the material which lowers the plasma breakdown threshold can be positioned within the focussing region. In this way a plasma pulse can be produced at a reproducible, pre-defined location in a controlled manner within the plasma chamber, thereby allowing thrust vector control of the drive device. Such thrust vector control enables an angular momentum to be generated, as a means of changing the position e.g. of a missile. The corresponding change in the angular momentum of the missile depends on how the resultant thrust vector is located relative to the centre of gravity of the missile. Rotating movements of the missile about an axis transverse to the direction of flight can then also be obtained by changing the mass distribution in the missile with no change in the resultant thrust vector. Since the thrust vector is controllable according to the invention, i.e. it can in particular also be maintained constant, there is thus a further method of changing the position e.g. of a missile.

In a particularly advantageously designed embodiment the plasma device includes a pin made of a material which lowers the plasma breakdown threshold. This pin then acts as an ignition pin. It can be positioned in the plasma chamber and especially in the focussing region in a simple manner to control the thrust vector of the propulsion device (e.g. in order to adjust the position of a spacecraft). The actual pin material may be used as a fuel when the pin evaporates; the material vapour can then act as an absorber to improve plasma production and also directly help to generate thrust. Plasma is produced in a substantially defined manner on a surface of the pin. Contact between the propagating plasma and an inner wall of the plasma chamber is thereby avoided.

It is beneficial for the pin to be arranged pivotably in the plasma chamber in order to control the thrust vector and thus the position e.g. of a spacecraft. Positioning the pin so that it can pivot within the focussing region in the plasma chamber enables the resulting pressure wave to be controlled.

The pin is beneficially displaceable in its longitudinal direction in the plasma chamber. This makes it possible for the material which lowers the plasma breakdown threshold (the ignition medium) to be followed up, particularly according to the burning action of the pin, as a means of ensuring uniform, reproducible formation of plasma pulses in the chamber.

It is structurally advantageous for the pin to be mounted in a sleeve which holds it in the plasma chamber. The sleeve provides a simple way of making the pin longitudinally displaceable, and if the sleeve is mounted for pivoting movement the pin can then be pivoted in the plasma chamber.

In an alternative embodiment a material which lowers the plasma breakdown threshold in the propellant may be blown into the focussing region. The threshold is then lowered at a blowing-in point at which the fluid ignition medium passes into the focussing region. The plasma ignition arrangement then advantageously comprises a member for blowing a threshold-lowering material into the focussing region. Provision is particularly made for the blowing-in member to be arranged pivotably in the plasma chamber, thereby allowing the location where the ignition medium is blown into the focussing region to be changed.

To enable the thrust vector to be controlled as required, an alternative embodiment provides for the blowing-in pressure of a material which lowers the plasma breakdown threshold to be adjustable into the focussing region. This particularly makes it possible to control the extent to which ignition medium blown into the plasma chamber from an orifice of the blowing-in member penetrates into the focussing region.

It is particularly advantageous for the electromagnetic radiation field to be introduced in to the plasma chamber in pulsed form. Reproducible, uniform plasma pulses can then be produced in the plasma chamber, resulting in shock waves which generate a thrust to drive e.g. a spacecraft.

It is beneficial when a laser pulse length is at most of the same order as the time taken by the plasma to propagate from its location of ignition to a geometric focal point. It is especially beneficial for the length of a laser pulse to be shorter than the corresponding propagation time. This guarantees that the plasma will ignite at the location defined by the plasma ignition arrangement and propagates from there as shock waves.

The electromagnetic radiation field is in particular a laser radiation field. High power can be fed into the propulsion device by means of pulsed, high-powered lasers, and transmission over distances of the order e.g. of 100 km to 1000 km is possible owing to the spatial coherence of laser radiation. Thus energy from a ground station may be fed into the focussing arrangement over great altitudes, to propel a flight vehicle provided with the propulsion device according to the invention.

In an alternative embodiment with a favourable manufacturing method the plasma chamber itself is constructed as focussing arrangement. No additional focussing arrangement need then be provided to introduce the electromagnetic radiation field into the plasma chamber and effect focussing there. It is advantageous for a wall of the plasma chamber to be constructed as a reflector. Radiation passed into the chamber is then reflected by a wall of the chamber into a focussing region where it can ignite a plasma.

To obtain high reflectivity a wall of the plasma chamber is advantageously polished or coated with a reflective layer or metallized, so that it absorbs or scatters as little radiation power as possible and so that the greatest possible radiation power reaches the focussing region.

A plasma chamber may be conical or of a paraboloid shape. It may also comprise a plurality of segments to guide the electromagnetic radiation into a focussing region. A paraboloid shape for the chamber is favourable, as there is a large opening angle ready to introduce the electromagnetic radiation and also a correspondingly large opening angle for guiding out the pressure wave to propel the propulsion device. In addition the radiation can be concentrated substantially independently of the direction of incidence.

It is then beneficial for the plasma ignition arrangement to be held in the region of an apex of the plasma chamber. The igniter holder is thus substantially outside the beam path of the electromagnetic radiation field and is affected very little by the plasma and resultant pressure wave.

In a particularly advantageous alternative embodiment air, especially atmospheric air, is used as the propellant. The propellant need not then be carried, so the weight is reduced and the design of the propulsion device is kept simple. Air as a propellant is suitable for propulsion devices used in the atmosphere, such as propulsion devices used near Earth's surface, for missiles within the atmosphere or for spacecraft as a propulsion stage within the atmosphere.

It is then beneficial for the plasma chamber to be provided with propellant feed apertures. These may in particular be slots arranged in a front region of the plasma chamber so that the propellant, especially atmospheric air, can easily pass into that chamber.

Alternatively or additionally a gas and/or liquid and/or solid carried by the propulsion device may be used as a propellant. If such propellants are blown into the plasma chamber in outer space a corresponding thrust can be achieved through the formation of plasma in the propellant. But in contrast with rockets propelled by chemical combustion processes an oxidant as required for combustion need not be carried.

It is beneficial for the electromagnetic radiation field to be used to evaporate the propellant. Part of the injected radiation power may for example be branched off for this purpose.

In an advantageous alternative embodiment a plasma chamber and/or a focussing arrangement is such constructed that there are a plurality of focussing regions provided. For example a plurality of channel-shaped paraboloids may be arranged adjacent each other. In this way a specific thrust vector can be set as required according to the particular application.

A plasma ignition arrangement is then beneficially associated with each focussing region, to obtain numerous possibilities of controlling the drive device.

In an advantageous alternative arrangement a plurality of plasma ignition arrangements are provided for one plasma chamber. According to the individual controlling of the various ignition arrangements pressure wave generation in the plasma chamber can then be controlled as required and a specific thrust vector thus generated and controlled according to the particular application.

It is beneficial if the plasma ignition arrangements can be individually controlled, e.g. if pins made of an ignition medium can be moved into or out of a focussing region. In this way a specific pressure wave distribution to generate a resultant thrust vector or to form a shock wave with a defined front can be adjusted in the plasma chamber.

In another alternative embodiment a plasma chamber has one or more focal lines. For this purpose reflectors of the focussing arrangement may for example be channel-shaped or toroidal. The plasma can then be ignited along such a focal line, thereby forming an appropriate pressure wave to generate a thrust vector for the propulsion device.

For example a focal line may be closed, with the corresponding reflector of the focussing arrangement in a toroidal shape. The plasma can then in particular be produced rotationally symmetrically to a centre of such a closed focal line.

It is beneficial for a plurality of plasma ignition arrangements to be arranged along a focal line in the plasma chamber, particularly so that the plasma can be ignited symmetrically on the focal line.

An alternative embodiment provides for a plasma ignition arrangement to comprise a blade-shaped member made of a material which lowers the plasma breakdown threshold in the propellant. Plasma ignition then preferably takes place at a sharp edge of such a member.

It is beneficial for a plasma ignition arrangement to be pivotable transversely to a focal line. The location of ignition can then be appropriately adjusted on the focal line. It is further beneficial for a plasma ignition arrangement to be height adjustable relative to a focal line, so that the place of plasma ignition can be specifically controlled.

The invention further relates to a shock wave generator wherein the propulsion device according to one of claims 1 to 30 is fixed stationary.

A generator of this type forms shock waves which may be used e.g. for testing material. In accordance with the invention the shock waves may be specifically controlled in respect of their propagation direction and the magnitude of their propagation vector.

The shock wave generator has the same advantages as those already explained in connection with the propulsion device according to the invention.

According to the invention the above-mentioned problem is further solved by the method described above, in that a material which lowers the plasma breakdown threshold in the propellant is brought into the focussing region.

This gives the advantages already explained in connection with the propulsion device according to the invention. Other advantageous embodiments have also been explained in connection with those propulsion devices.

It is beneficial for the material which lowers the plasma breakdown threshold to be positioned in the focussing region as a pin. This gives rise to many possibilities of controlling the pressure wave emerging from the plasma chamber. In particular the pin is movable relative to the focussing region for that purpose. The movement of the pin is advantageously controlled in order to control the discharge vector of the pressure wave, formed by the production of plasma, from the plasma chamber.

It is particularly advantageous for the electromagnetic radiation field to be supplied in pulsed form so that uniform plasma pulses can be produced in the plasma chamber, whereby pulsed pressure waves are formed.

BRIEF DESCRIPTION OF THE DRAWING

The following description of preferred embodiments of the invention serves to explain the invention, together with the drawing in which:

FIG. 7 is a graph plotting the phase of shock wave fronts with a parabolically shaped plasma chamber over the location of emergence from the chamber in a discharge plane;

As shown in FIG. 1, an embodiment of a propulsion device according to the invention comprises a plasma chamber 10 with a plasma chamber wall 12 and a chamber volume 14. The chamber 10 is connected to a body to be propelled, e.g. a spacecraft (not shown in the drawing).

Figure 1:
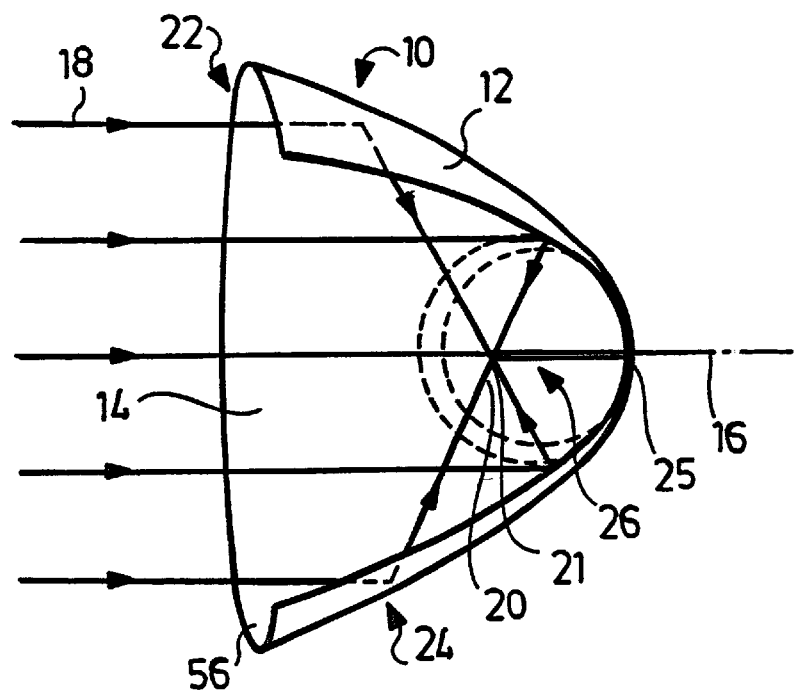
FIG. 1 is a diagrammatic representation of a plasma chamber with a plasma ignition arrangement in accordance with the invention.

The plasma chamber 10 is rotationally symmetrical about an axis 16. In the FIG. 1 embodiment it is in the form of a rotation paraboloid. The chamber 10 is constructed as a reflector through having an inner wall polished or coated with a reflective layer, so that electromagnetic radiation 18 entering the chamber space 14 is reflected into a focussing region 20. An electromagnetic radiation field enters the chamber volume 14 through an entry aperture 22. The paraboloid shape of the plasma chamber 10 causes electromagnetic radiation to be reflected into the focussing region 20.

The plasma chamber 10 has a geometric focal point 21, around which the focussing region 20 is located. The focussing region 20 is thus the region around the focal point 21 which has high enough energy density to ignite a plasma.

The plasma chamber 10 is thus also constructed as a focussing arrangement 24 for the electromagnetic radiation field, for focussing its energy into the region 20.

Figure 2:
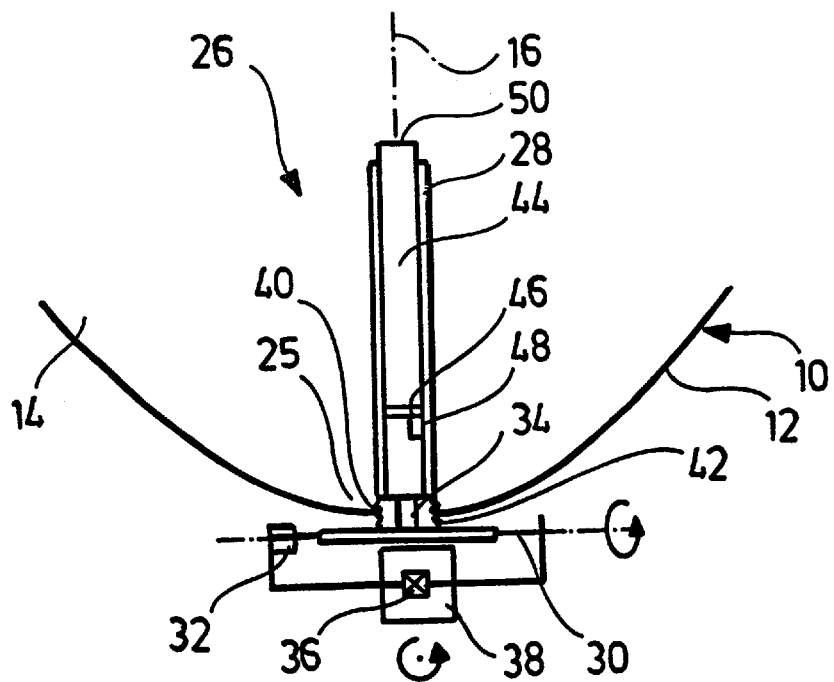
FIG. 2 is a view of a detail in the FIG. 1 plasma ignition arrangement.

A plasma ignition arrangement shown generally at 26 is held at or in the region of the apex 25 of the plasma chamber 10 (FIG. 2). A material (the ignition medium) which lowers the plasma breakdown threshold in a propellant introduced into the chamber volume 14 can be brought into the focussing region 20 by this ignition arrangement.

In an alternative embodiment shown in FIG. 2 the plasma ignition arrangement 26 comprises a sleeve 28 such arranged in the chamber volume 14 that it can pivot transversely to the axis 16. For this purpose the sleeve 28 in the illustrated alternative embodiment is mounted on gimbals outside the plasma chamber 10 by a shaft 30, which is aligned substantially perpendicular to the axis 16 and which can be rotated by a drive 32 as a means of swivelling the sleeve 28, which is joined to the shaft by a connecting element 34. In the embodiment illustrated the sleeve 28 may be swivelled by the shaft 30 in a plane normal to the plane of the drawing.

The shaft 30 and the drive 32 may in turn be rotated as an entity transversely thereto by a shaft 36; this rotation may be effected by a drive 38. In the FIG. 2 embodiment the axis of rotation of the shaft 36 is normal to the plane of the drawing, so the sleeve 28 can be swivelled in the plane of the drawing.

The drives 32 and 38 are constructed so that the sleeve 28 can be secured in a defined pivoting position relative to the axis 16.

To enable the sleeve 28 to be swivelled in the chamber volume 14 the wall 12 of the plasma chamber is provided at the apex 25 with an aperture 40, through which the connecting element 34 is guided in order to join the sleeve 28 to the shaft 30. The chamber space 14 is sealed at the aperture 40 by a flexible seal 42 e.g. a bellows, which allows the sleeve 28 to swivel.

The sleeve 28 and seal 42 are made of a material which is heat resistant in respect of the temperatures reached in the chamber space 14. The corresponding material also has a high plasma breakdown threshold in order not to affect the required ignition of a plasma by the plasma ignition arrangement 26.

A pin 44 made of a material which lowers the plasma breakdown threshold in the propellant is guided displaceably in the sleeve 28. The pin may for example be made of a metal and particularly of copper. It is seated on a sliding base 46 and in particular fixed thereto. The sliding base 46 is guided displaceably in the sleeve 28 along an axis of the sleeve, so that a depth to which the pin 44 is inserted in the focal region 20 may be varied.

For displaceable guidance of the sliding base 46 the sleeve 28 may e.g. have a toothed strip on an inner wall and the sliding base may be provided with a driven gearwheel 48.

The plasma breakdown threshold is lowered by the pin 44 in the focussing region 20. Plasma ignition then takes place at a defined location, namely substantially on the surface at a front end 50 of the pin 44.

Figure 3:
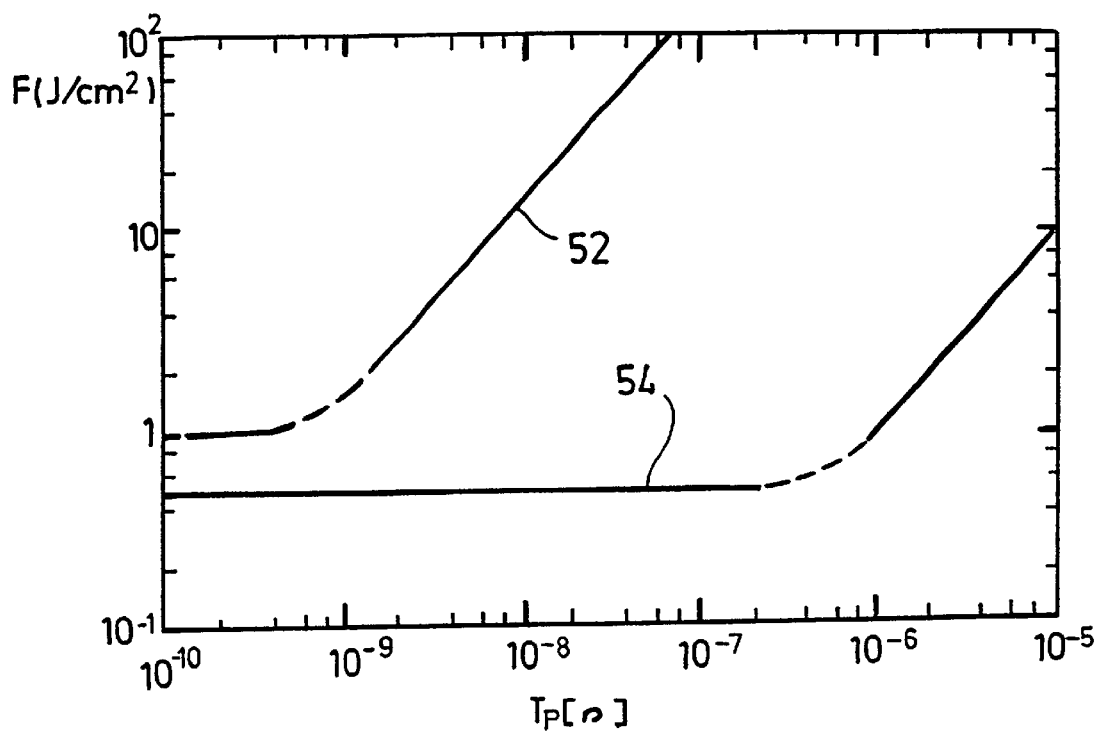
FIG. 3 shows the progress of the plasma breakdown threshold in air compared to the breakdown threshold with copper vapour over a copper surface in air, with laser light being supplied from a pulsed $CO_2$ laser with a wavelength of 10.6 $\mu$m; the ordinate is the laser pulse fluence F and the abscissa the pulse duration $T_p$.

In FIG. 3 the breakdown threshold 52 for air at a pressure of 1 atmosphere, compared to the breakdown threshold 54 for copper vapour over a copper surface in air, is shown in a graph plotting fluence F over pulse duration $T_p$. The pulses are $CO_2$ laser pulses at a laser wavelength of 10.6 $\mu$m. With a pulse duration $T_p$ of 10 $\mu$s the breakdown threshold in air is 15 $kJ/cm^2$ and with copper vapour over a copper surface 10 $J/cm^2$, i.e. a copper pin 44 lowers the breakdown threshold by three orders of magnitude.

An alternative embodiment provides for the ignition medium to be blown into the focussing region 20 e.g. in powder form or as a gas. For this purpose the sleeve 28 is constructed as a blowing-in member through which the ignition medium may be blown into the plasma chamber 10 (not shown in the drawing). In particular the injection pressure may be controlled, as a means of controlling the ignition location where plasma ignition commences.

The pin 44 which acts as an ignition pin for the plasma advantageously has low reflectivity for electromagnetic radiation 18, so that no significant part of the radiation is reflected out of the focussing region 20 by the pin 44.

The propulsion device according to the invention operates as follows:

Electromagnetic radiation 18 is coupled into the plasma chamber 10 e.g. by a pulsed, earth-stationary, high-powered laser. Owing to its construction as a focussing arrangement 24 the radiation 18 in the plasma chamber 10 is focussed into the focussing region 20 so that the energy density there is high. The pin 44 projects into the focussing region 20, or an ignition medium fluid is blown into the focussing region 20 by the blowing-in member. Plasma ignition consequently takes place in a reproducible manner, i.e. at a pre-defined location and a defined time. The pre-defined location is substantially provided by the upper end 50 of the pin 44 or by a blowing-in orifice of the blowing-in member.

The plasma chamber 10 contains a propellant which has been fed to it. This may for example be atmospheric air. As an additional or alternative measure a propellant such as a gas and/or liquid and/or solid may additionally be carried with the propulsion device e.g. in a spacecraft. The liquid and/or solid is then heated, producing a propellant in vapour form. The electromagnetic radiation field 18 is used in particular for heating the liquid or solid propellant , e.g. by branching off a corresponding part-radiation field and applying it to the liquid or solid propellant. The propellant in vapour form is then fed to the plasma chamber 10 (not shown in the drawing).

When the plasma has been ignited on the surface of the end 50 of the pin 44 or at an orifice of the blowing-in member, it spreads onto the surrounding propellant thermally and through released electrons. If a critical electron density in the order of magnitude of $10^{18}$ $cm^{-3}$ is exceeded, then the electromagnetic radiation 18 is substantially completely absorbed in the plasma in the chamber 10.

The plasma expands explosively and accelerates the propellant in the chamber 10. The propellant then escapes in a supersonic flow over a discharge plane 56 of the chamber 10 and is fed e.g. to a nozzle arrangement (not shown in the drawing). The pressure wave formed in the propellant (the shock wave) produces a thrust, so that a momentum is imparted by the propulsion device to a body connected thereto. This then causes the body to be propelled.

A pulsed pressure wave and thus a pulsed thrust vector are created by the pulsing of the injected radiation power. Care must be taken subsequently to feed additional propellant into the plasma chamber 10. If the propellant is atmospheric air which can penetrate into the chamber volume 14, then the volume is automatically filled with the propellant. In particular the plasma chamber 10 is then provided with air-supply apertures such as slots, so that air can pass into the volume 14 as a propellant (not shown in the drawing). Such apertures are preferably located at a front side facing away from the apex 25.

The pulse length of the coupled radiation power is adjusted such that it is shorter than the time taken for a shock wave to run from the plasma ignition location, predetermined by the plasma ignition arrangement 26, to the geometric focal point 21.

If the propulsion device is kept stationary the plasma chamber 10 acts as a shock wave generator whereby shock waves can be generated in a specific manner, with a shock wave emerging from the discharge plane 56.

As the sleeve 28 is arranged pivotably in the plasma chamber 10 so that the pin 44 or the blowing-in member is pivotable, the pre-defined location of plasma ignition in the focussing region 20 can be adjusted. Hence the pressure wave emerging from the discharge plane 56 can in turn be controlled, thus in turn controlling a resulting thrust vector, particularly as a means of controlling the position of the propulsion device and thus of a body connected to the propulsion device. If the plasma chamber is used as a shock wave generator the shock wave formed can correspondingly be controlled.

Figure 4:
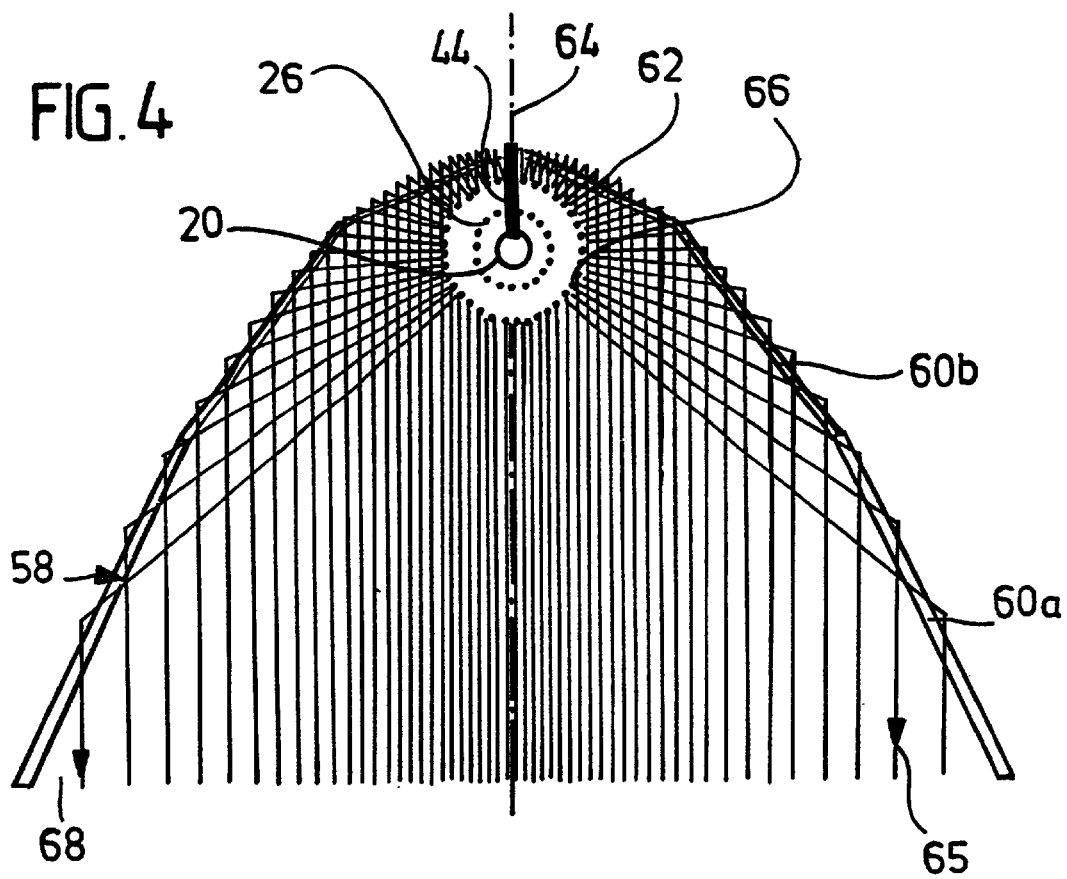
FIG. 4 shows the progress of pressure wave fronts in the FIG. 1 plasma chamber, calculated by ray tracing, with the plasma ignition arrangement aligned collinearly with an axis of the plasma chamber.

FIG. 4 shows a plasma chamber 58 formed by successive frustoconical segments 60a and 60b and an adjoining conical segment 62. The chamber 58 has an approximately parabolic shape and is rotationally symmetrical about an axis 64. The course of wave propagation directions 65 has been drawn, calculated by ray tracing; outgoing pressure wave fronts (shock wave fronts) in the propellant are perpendicular to the directions 65. The starting point is a spherical shock wave 66 formed by plasma ignition at the plasma ignition arrangement 26. The emerging shock wave fronts produce a forward thrust at the plasma chamber 58, to propel e.g. a spacecraft.

Figure 5:
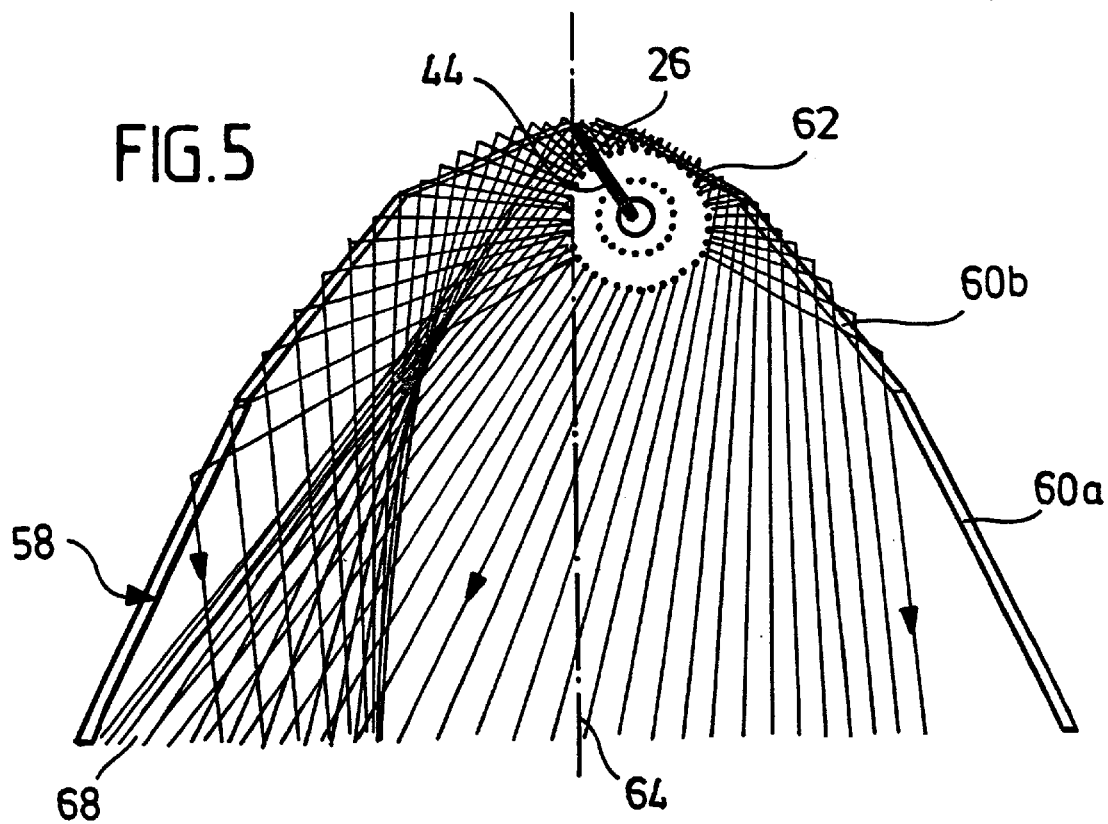
FIG. 5 shows the calculated pressure wave progress with an ignition arrangement inclined to the axis of the plasma chamber.

In FIG. 5 the pin 44 of the plasma ignition arrangement is tilted relative to the axis 64. The location where the plasma is ignited is consequently outside the axis 64 and outside the geometric focus of the plasma chamber 58.

Figure 6:
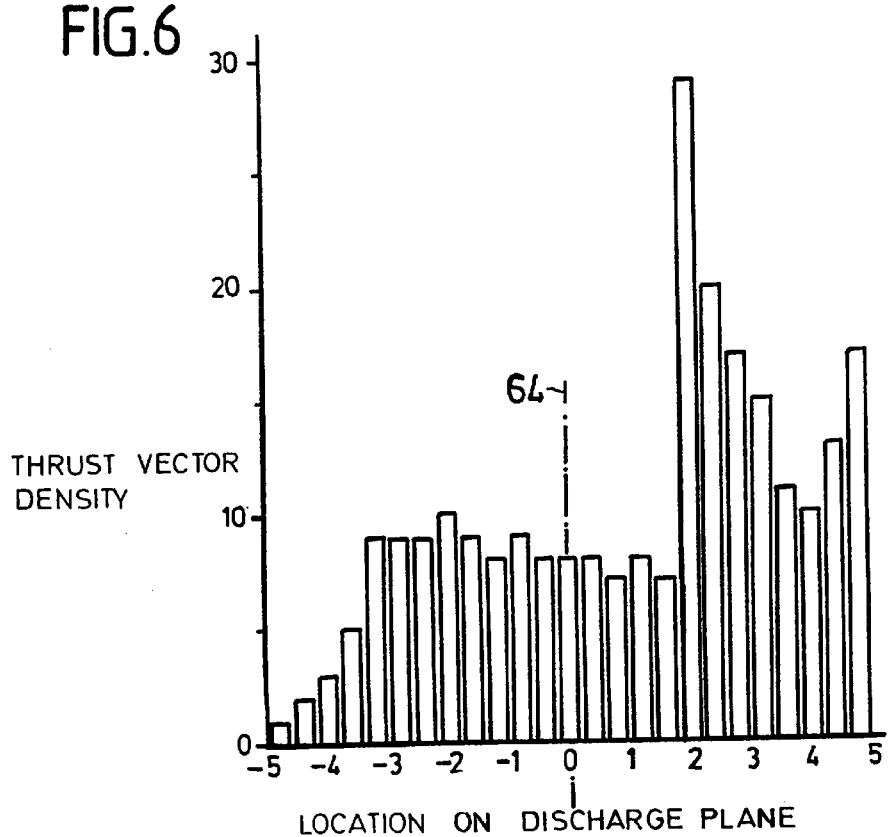
FIG. 6 shows the thrust vector distribution in a discharge plane of the plasma chamber with the plasma ignition arrangement according to FIG. 5.

The resultant thrust vector density distribution in a discharge plane 68 of the plasma chamber 58 is shown in FIG. 6. The zero line corresponds to the axis 64 (the centre of symmetry) and positive values correspond to the direction to the left of the axis 64 in FIG. 5.

The height of the bars in the FIG. 6 chart indicates the thrust vector density. The thrust vector density is plotted in arbitrary units.

It will be seen from FIG. 6 that the tilting of the pin 44 results in a higher thrust vector density in the region of the discharge plane 68 from which the pin 44 is tilted away. The pivoting movement of the plasma ignition arrangement 26 thereby produces a torque, by means of which the position of a spacecraft propelled by the propulsion device according to the invention can be controlled.

If, as shown in FIG. 4, the pin 44 is directed through the geometric focus of the plasma chamber 58, the pressure wave produced has a plane front.

FIG. 7 shows the phase, in arbitrary units, over the location in the discharge plane, for the FIG. 5 model. The curve 70 represents the direct wave, i.e. the wave which exits from the discharge plane without previously being reflected on walls of the plasma chamber 58. The phase position is not symmetric with the zero line, i.e. with the axis 64, as the plasma ignition arrangement 26 is tilted relative to the axis 24.

The course of the phase of a reflected wave 72 is also shown.

Just as, with reference to FIG. 5, no direct wave appears at the left edge of the discharge plane 68 of the plasma chamber 58 when the plasma ignition arrangement is tilted to the right (high positive values on the abscissa in FIG. 7), correspondingly no reflected wave appears at the right edge (high negative values on the abscissa in FIG. 7).

Multiple reflections 74 occur at the left edge, that is to say, a wave is reflected more than once on an inner wall of the plasma chamber. This causes the corresponding phase displacement shown at reference 74 in FIG. 7.

As the pin 44 is height displaceable in the sleeve 28 it can be followed up into the focussing range 20, particularly according to its burning behaviour. For example the pin may evaporate at its end 50 so that the corresponding evaporated material acts as an absorber for the electromagnetic radiation. The ignition medium to be evaporated may also contribute directly to producing thrust, through an increase in mass expulsion and hence of pulse transmission.

Figure 8:
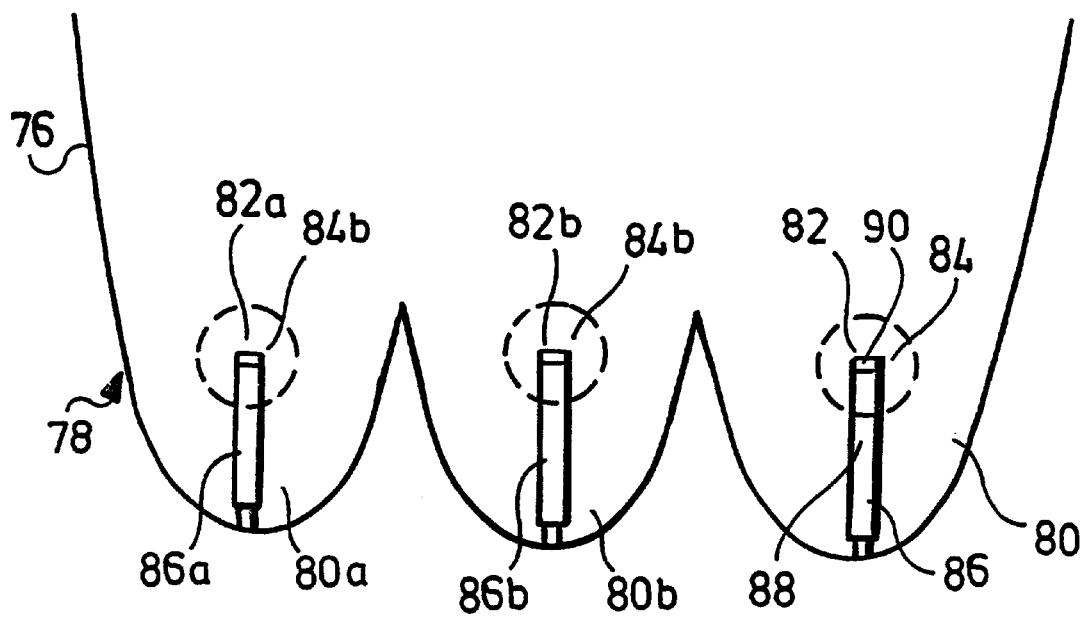
FIG. 8 is a further embodiment of a plasma chamber with a plurality of focussing regions.

In a further embodiment shown in FIG. 8, a plasma chamber 76 according to the invention comprises a plurality of focussing arrangements 78. The plasma chamber 76 is accordingly made up of a plurality of parabolic channels 80, 80a, 80b arranged adjacent each other. A channel 80 of this type has a geometric focal line 82 directed longitudinally of the channel (perpendicular to the plane of the drawing in FIG. 8). Hence the plasma chamber 76 in turn has a plurality of focal lines 82, 82a and 82b in the embodiment illustrated, where the chamber 76 comprises three parabolic channels 80, 80a, 80b. The focussing arrangement 78 then has a plurality of focussing regions 84, 84a, 84b, the individual focussing regions being separated from each other. A plasma ignition arrangement 86, 86a, 86b is arranged in each parabolic channel 80, 80a, 80b.

Provision may also be made for a plurality of corresponding plasma ignition arrangements to be arranged along a focal line 82, 82a, 82b.

A plasma ignition arrangement 86 in particular comprises a pin 88 made of a material which lowers the plasma breakdown threshold in the propellant (the ignition medium); the pin is blade-shaped with a blade 90 directed in particular across the associate d focal line 82. A pin 88 of this type is prefer ably held in the respective parabolic channel 80 so that it can pivot across the associated focal line 82, and hence the orientation of the blade 90 to the corresponding focal line 82 is variable.

Each of the plasma ignition arrangements 86 can preferably be controlled individually. This can be done for example by shifting an individual pin 88 out of the focal region, so that no plasma is then ignited where there is no pin.

Figure 9:
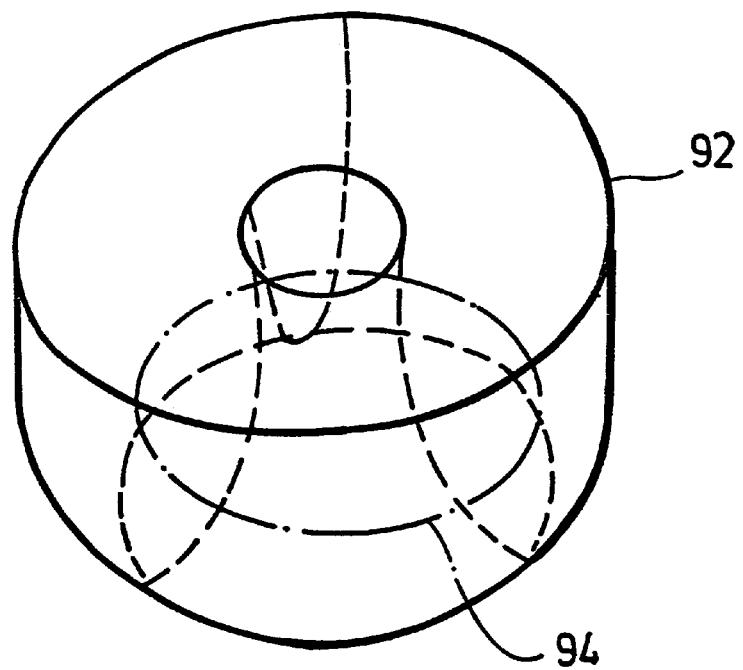
FIG. 9 is a further embodiment of a plasma chamber.

In a further embodiment shown in FIG. 9, a plasma chamber 92 has a closed focal line 94. For this purpose the chamber 92 is made in annular form, for example by closing a parabolic channel type structure in a toroidal shape. The plasma chamber 92 thereby has the shape of a parabolic toroid.

Corresponding plasma ignition arrangements 26 are positioned along the focal line 94, e.g. with pins 88 of ignition medium (not shown in the drawings). In particular the pins are mounted for pivoting movement across the focal line 94.

The propulsion device according to the invention may also be used for driving machine components; for example a drive gear or thrust piston may be provided with a corresponding plasma chamber and the shock waves produced after ignition of the plasma cause the drive gear or thrust piston to be propelled.

The present disclosure relates to the subject matter disclosed in German Patent Application No. 100 17 343.8 of Apr. 07, 2000 the entire specification of which is incorporated herein by reference.

What is claimed is:

1. A propulsion device particularly for a spacecraft, comprising a plasma chamber (10; 76; 92) in which a plasma is producible in a propellant, and a focussing arrangement (24; 78) for focussing an electromagnetic radiation field (18) into a focussing region (20) in the plasma chamber in order to produce the plasma, characterised in that a plasma ignition arrangement (26) for bringing a material which lowers the plasma breakdown threshold in the propellant into the focussing region (20) is arranged in the plasma chamber (10; 76; 92).

2. A propulsion device according to claim 1, characterised in that the material which lowers the plasma breakdown threshold is a metal.

3. A propulsion device according to claim 1, characterised in that the material which lowers the plasma breakdown threshold is copper.

4. A propulsion device according to claim 1, characterised in that the plasma ignition arrangement (26) is arranged to be so movable in the plasma chamber (10) that the material which lowers the plasma breakdown threshold can be positioned within the focussing region (20).

5. A propulsion device according to claim 1, characterised in that the plasma ignition arrangement (26) comprises a pin (44) made of a material which lowers the plasma breakdown threshold.

6. A propulsion device according to claim 5, characterised in that the pin (44) is arranged pivotably in the plasma chamber (10).

7. A propulsion device according to claim 5, characterised in that the pin (44) is arranged in its longitudinal direction displaceable in the plasma chamber (10).

8. A propulsion device according to claim 5, characterised in that the pin (44) is mounted in a sleeve (28) by means of which the pin is held in the plasma chamber (10).

9. A propulsion device according to claim 1, characterised in that a material which lowers a plasma breakdown threshold in the propellant is blown into the focussing region (20).

10. A propulsion device according to claim 9, characterised in that the plasma ignition arrangement comprises a blowing-in member for blowing a material which lowers a plasma breakdown threshold into the focussing region (20).

11. A propulsion device according to claim 10, characterised in that the blowing-in member is arranged pivotably in the plasma chamber (10).

12. A propulsion device according to claim 10, characterised in that the blowing-in pressure of a material which lowers the plasma breakdown threshold into the focussing region (20) is adjustable.

13. A propulsion device according to claim 1, characterised in that the electromagnetic radiation field (18) is introduced into the plasma chamber (10) in pulsed form.

14. A propulsion device according to claim 13, characterised in that a pulse length is at the most of the same order of magnitude as the time required for the plasma to propagate from its ignition location to an optical focal point (21).

15. A propulsion device according to claim 1, characterised in that the electromagnetic radiation field (18) is a laser radiation field.

16. A propulsion device according to claim 1, characterised in that the plasma chamber (10) is constructed as a focussing arrangement (24).

17. A propulsion device according to claim 16, characterised in that a wall (12) of the plasma chamber is constructed as a reflector.

18. A propulsion device according to claim 17, characterised in that a wall (12) of the plasma chamber is polished or coated with a reflective layer or metallized.

19. A propulsion device according to claim 16, characterised in that the plasma chamber (10) has a paraboloid shape.

20. A propulsion device according to claim 19, characterised in that the plasma ignition arrangement (26) is held in the region of an apex (25) of the plasma chamber (10).

21. A propulsion device according to claim 1, characterised in that air is used as propellant.

22. A propulsion device according to claim 1, characterised in that a gas and/or liquid and/or solid carried with the propulsion device is used as propellant.

23. A propulsion device according to claim 21, characterised in that the plasma chamber (10) is provided with propellant feed apertures.

24. A propulsion device according to claim 22, characterised in that the electromagnetic radiation field (18) is used to evaporate the propellant.

25. A propulsion device according to claim 1, characterised in that a plasma chamber (76) and/or a focussing arrangement (78) is constructed so as to provide a plurality of focussing regions (84, 84a, 84b).

26. A propulsion device according to claim 25, characterised in that a plasma ignition arrangement (86) is associated with each focussing region (84, 84a, 84b).

27. A propulsion device according to claim 25, characterised in that a plurality of plasma ignition arrangements (86) are provided for one plasma chamber (76).

28. A propulsion device according to claim 26, characterised in that the plasma ignition arrangements (86) are individually controllable.

29. A propulsion device according to claim 1, characterised in that a plasma chamber (76; 92) has one or more focal lines (82, 82a, 82b; 94).

30. A propulsion device according to claim 29, characterised in that a focal line (94) is closed.

31. A propulsion device according to claim 29, characterised in that a plurality of plasma ignition arrangements are arranged along a focal line (82, 82a, 82b; 94) in the plasma chamber (76; 92).

32. A propulsion device according to claim 31, characterised in that a plasma ignition arrangement (86) comprises a blade-shaped member (88) made of a material which lowers the plasma breakdown threshold in the propellant.

33. A propulsion device according to claim 31, characterised in that a plasma ignition arrangement (86) is pivotable transversal to a focal line (82, 82a, 82b).

34. A propulsion device according to claim 31, characterised in that a plasma ignition arrangement (86) is height adjustable relative to a focal line (82, 82a, 82b).

35. A shock wave generator, comprising a propulsion device as described in claim 1, wherein the propulsion device is fixed stationary.

36. A method of forming shock waves, particularly for propelling a spacecraft, by producing a plasma in a propellant, wherein an electromagnetic radiation field is focussed into a focussing region of a plasma chamber to produce plasma in the propellant, characterised in that a material which lowers the plasma breakdown threshold in the propellant is introduced into the focussing region.

37. A method according to claim 36, characterised in that the material which lowers the plasma breakdown threshold is positioned in the focussing region as a pin.

38. A method according to claim 37, characterised in that the pin is movable relative to the focussing region.

39. A method according to claim 38, characterised in that the movement of the pin is controlled.

40. A method according to claim 36, characterised in that the electromagnetic radiation field is supplied in pulsed form.

* * * * *